United States Patent
Itskovich

(10) Patent No.: US 7,167,006 B2
(45) Date of Patent: Jan. 23, 2007

(54) METHOD FOR MEASURING TRANSIENT ELECTROMAGNETIC COMPONENTS TO PERFORM DEEP GEOSTEERING WHILE DRILLING

(75) Inventor: Gregory Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/390,597

(22) Filed: Mar. 28, 2006

(65) Prior Publication Data

US 2006/0197533 A1   Sep. 7, 2006

Related U.S. Application Data

(62) Division of application No. 10/746,071, filed on Dec. 24, 2003, now Pat. No. 7,046,009.

(51) Int. Cl.
*G01V 3/08* (2006.01)
*G01V 3/10* (2006.01)

(52) U.S. Cl. .................................. 324/338; 324/339

(58) Field of Classification Search ......... 324/338–339
See application file for complete search history.

(56) References Cited

U.S. PATENT DOCUMENTS

| | | | |
|---|---|---|---|
| 5,452,761 A | 9/1995 | Beard et al. | 166/250 |
| 5,530,359 A | 6/1996 | Habashy et al. | 342/338 |
| 5,955,884 A | 9/1999 | Payton et al. | 324/339 |
| 6,188,222 B1 | 2/2001 | Seydoux et al. | 324/339 |
| 6,400,149 B1 | 6/2002 | Luong et al. | 324/303 |
| 2003/0085707 A1 | 5/2003 | Minerbo et al. | 324/343 |
| 2003/0184299 A1 | 10/2003 | Strack | 324/323 |
| 2003/0184304 A1 | 10/2003 | Homan et al. | 324/343 |

*Primary Examiner*—Bot LeDynh
(74) *Attorney, Agent, or Firm*—Madan, Mossman & Sriram, P.C.

(57) ABSTRACT

A transverse induction transmitter on an instrument induces currents in an earth formation when it is pulsed. Transient measurements made at transverse and axial receivers are used for determination of a distance to a bed boundary. This may be used to control the drilling direction. Alternatively, a transmitter on an instrument having a conductive body induces currents in the earth formation. Transient signals are measured and the effect of the conductive body is removed by using a reference signal measured in a homogenous space.

20 Claims, 13 Drawing Sheets

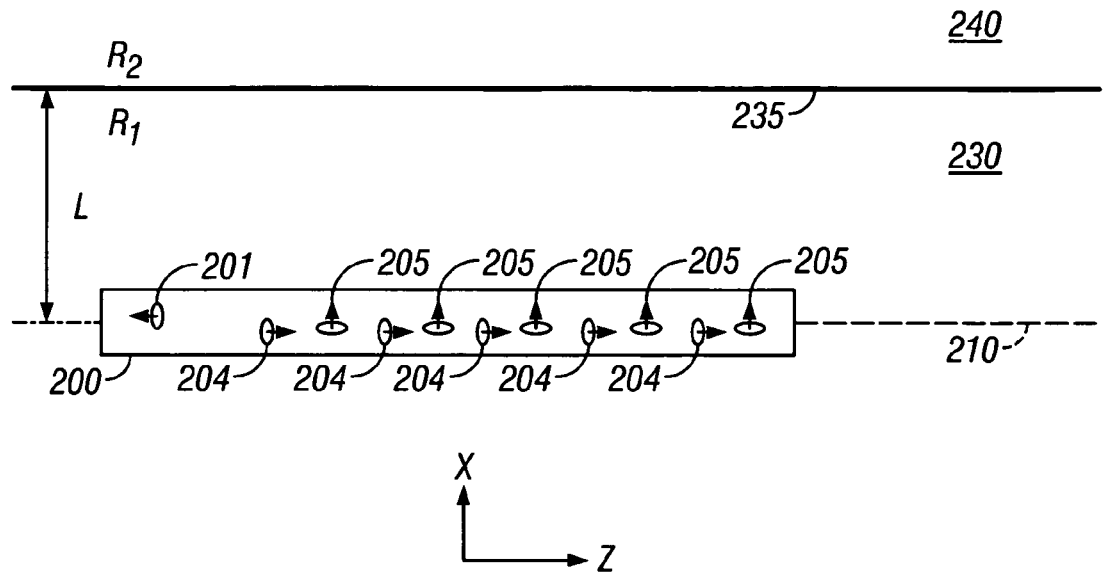
FIG. 2
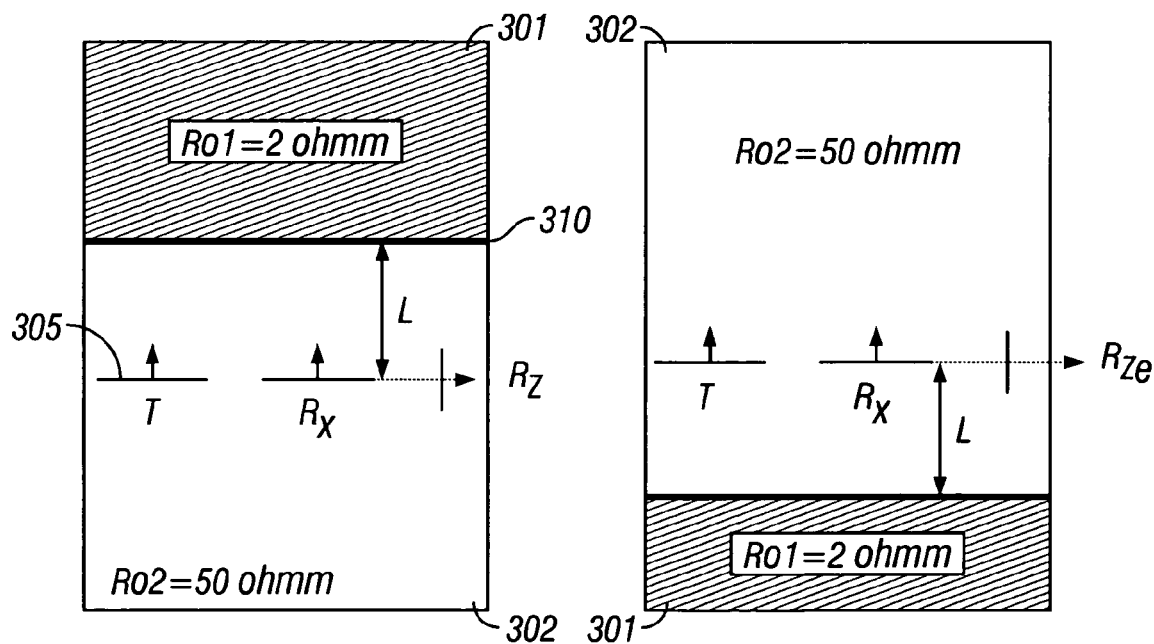
FIG. 3A  FIG. 3B

METHOD FOR MEASURING TRANSIENT ELECTROMAGNETIC COMPONENTS TO PERFORM DEEP GEOSTEERING WHILE DRILLING

CROSS-REFERENCES TO RELATED APPLICATIONS

This application is a divisional application with a priority claim to U.S. patent application Ser. No. 10/746,071 filed on Dec. 24, 2003 now U.S. Pat. No. 7,046,009.

BACKGROUND OF THE INVENTION

1. Field of the Invention

The present invention is related to the field of transient electromagnetic field measurements made in a geological formation. Specifically, the invention increases an azimuthal sensitivity and resolution of the transient field to formation boundaries.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761, to Beard et al. The instrument described in the Beard patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available down-hole.

At the ultra-deep scale, technology may be employed based on transient field behavior. The transient electromagnetic (TEM) field method is widely used in surface geophysics. Examples of transient technology are seen, for example, in Kaufman et al., 1983, "Frequency and transient soundings", Elsevier Science.; Sidorov et al., 1969, "Geophysical surveys with near zone transient EM." published by NVIGG, Saratov, Russia; and Rabinovich et al., 1981, "Formation of an immersed vertical magnetic dipole field": J Geologiya I Geofizika, N 3. Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter (see Kaufman et al., 1983). This transient field is especially important for logging. Use of a symmetric logging tool using transient field measurements for formation detection is discussed, for example, in U.S. Pat. No. 5,530,359, to Habashy et al.

U.S. Pat. No. 5,955,884, to Payton et al., discusses methods for measuring transient electromagnetic fields in rock formations. Electromagnetic energy is applied to the formation and waveforms that maximize the radial depth of penetration of the magnetic and electric energy. Payton comprises at least one electromagnetic transmitter and at least one electric transmitter for applying electric energy. The transmitter may be either a single-axis or multi-axis electromagnetic and/or electric transmitter. In one embodiment the TEM transmitters and TEM receivers are separate modules that are spaced apart and interconnected by lengths of cable, with the TEM transmitter and TEM receiver modules being separated by an interval of from one meter up to 200 meters, as selected. Radial depth of investigation is related to the skin depth $\delta=\sqrt{2/\sigma\mu\omega}$ which in turn is related to frequency. Lower frequency signals can increase the skin depth. Similarly, the conductivity of the surrounding material inversely affects the skin depth. As conductivity increases, the depth of investigation decreases. Finite conductivity casing of the apparatus therefore can reduce the depth of investigation.

Rapidly emerging measurement-while-drilling (MWD) technology introduces a new, meso-deep (3–10 meters) scale for an electromagnetic logging application related to well navigation in thick reservoirs. A major problem associated with the MWD environment is the introduction of a metal drill pipe close to the area being measured. This pipe produces a very strong response and significantly reduces the sensitivity of the measured EM field to the effects of formation resistivities and remote boundaries. Previous solutions for this problem typically comprise creating a large spacing (up to 20 meters) between transmitter and receiver. Such a system is discussed in U.S. Pat. No. 6,188,222 B1, to Seydoux et al. The sensitivity of such a tool to remote boundaries is low. Currently, Stolar Horizon, Inc. is developing drill string radar (DSR) for Coal Bed Methane wells. DSR provides 3-D imaging within a close range of the wellbore.

Currently, induction tools operate to obtain measurements either in the presence of a primary field or by using transient field techniques. Examples of current techniques for obtaining measurements using either primary field or transient field phenomena in measurement-while-drilling methods include the Multiple Propagation Resistivity (MPR) device, and the High-Definition Induction Logging (HDIL) device for open hole that utilizes a transient technique. In these techniques, one or more transmitters disposed along a drill tool act as a primary source of induction, and signals are received from the formation at receiver coils placed at an axial distance from the transmitters along the drill tool. One disadvantage of both MPR and HDIL methods is that the primary source of induction from the transmitter is always present during the time frame in which the receivers are obtaining measurements from the formation, thereby distorting the intended signal. This can be solved by using pulse excitations such as is done in a transient induction tool.

In a typical transient induction tool, current in the transmitter coil drops from its initial value $I_0$ to 0 at the moment $t=0$. Subsequent measurements are taken while the rotating tool is moving along the borehole trajectory. The currents induced in the drilling pipe and in the formation (i.e. eddy currents) begin diffusing from the region close to the transmitter coil in all the directions surrounding the transmitter. These currents induce electromagnetic field components which can be measured by induction coils placed along the conductive pipe. Signal contributions due to the eddy currents in the pipe are considered to be parasitic, since the signal due to these currents is much stronger than the signal from the formation. In order to receive a signal which is substantially unaffected by the eddy currents in the pipe, one can measure the signal at the very late stage, at a time in which the signals from the formation dominate parasitic signals due to the pipe. Although the formation signal dominates at the late stage, it is also very small, and reliable measurement can be difficult. In prior methods, increasing the distance between transmitter and receivers reduces the influence of the pipe and shifts dominant contribution of the formation to the earlier time range. Besides having limited resolution with respect to an oil/water boundary, such a system is very long (up to 10–15m) which is not desirable and convenient for an MWD tool.

A number of publications describe different applications of a MPR resistivity logging measurements (see, for-example, Meyer, W., 1997, Multi-parameter propagation resistivity interpretation, 38$^{th}$ SPWLA annual transactions, paper GG). All these publications describe dual pairs of transmitting antennas that permit long- and short-spaced measurements of phase difference and attenuation resistivities at the frequencies of 2MHz and 400MHz. The resulting resistivity curves support detailed quantitative and petrophysical analysis. Currently, the MPR tool has no means to resolve formation in azimuthal direction and the depth of investigation is limited to several feet.

MPR offers the benefits of several feet depth of investigation for $R_t$ determination and bed boundary detection during reservoir navigation along with the enhanced accuracy over a broad range of resistivities. The lack of resolving capability in the azimuthal direction and inability to resolve ultra-deep formation represent the main limitation of MPR for geosteering. Indeed, in a formation such as FIG. 3A, the MPR tool has the same readings as there would be in the formation in FIG. 1B. Even a transversal arrangement of the transmitting and receiving coils such as in 3DEX does not distinguish between the model in FIG. 3A and the model in FIG. 3B.

U.S. patent application Ser. No. 10/295,969 of Tabarovsky discusses a method of obtaining a parameter of interest, such as resistivity, of an earth formation using a tool having a body with finite, non-zero conductivity. The method obtains a signal from the earth formation that is substantially independent of the conductivity of the tool. A first signal is produced using a transmitter on the tool. An axially separated receiver receives a second signal that results from an interaction of the first signal with the earth formation. The second signal is dependent on the conductivity of the induction tool. This second signal can be represented using a Taylor series expansion in one half of odd integer powers of time. At least one leading term of the Taylor series expansion can be subtracted from the second signal. By suitable processing of the signals, Tabarovsky teaches the determination of the formation resistivity. The examples given in the Tabarovsky application use z-oriented transmitter and receiver coils.

There is a need for increasing a sensitivity and resolution of measured transient fields in to a distant boundary in a geologic formation. The present invention fulfills this need.

SUMMARY OF THE INVENTION

One embodiment of the present is an apparatus and method of using an electromagnetic instrument in a borehole in an earth formation. Current through a transmitter is changed, thereby inducing currents in said earth formation. The transmitter has an axial direction that may be inclined to the axis of the instrument. Temporal signals are received at each of at least two receivers. One of the at least two receivers has an axial direction that is substantially parallel to the axial direction of the transmitter, and another of the at least two receivers has an axial direction inclined to said first axial direction. The changing of the current may be either a switching on or a switching off. At least one additional transmitter may be provided on the instrument, the additional transmitter having an axis inclined to the axis of the first transmitter. Additional temporal signals are received at the at least two receivers in response to a change in the current in the additional transmitter and these additional measurements may be further used to determine a distance to the interface. The instrument may be part of a bottomhole assembly (BHA) that includes a drillbit.

The determination of the distance may be done by a downhole processor o the BHA. The downhole processor may be further used to control the drilling direction of the BHA. This may be used to control the drilling depth and maintain the BHA at a desired distance from the interface that may be a bed boundary or a fluid interface (such as a gas-oil interface, an oil-water interface, or a gas-water interface).

In another embodiment of the invention, the determination of distance to an interface is done by subtracting a reference signal from a measured temporal signal. The reference signal may be obtained by making temporal measurements with the instrument in a substantially homogenous space. The transmitter axis may be parallel or perpendicular to the instrument axis. The instrument may include a conductive pipe and a non-conducting material, possibly a ferrite separating the conductive pipe from the transmitter.

BRIEF DESCRIPTION OF THE DRAWINGS

The present invention is best understood with reference to the accompanying drawings in which like numerals refer to like elements and in which:

FIG. 2 shows the measurement tool in a horizontal well;

FIGS. 3A–B show a transmitter-receiver system in relation to an formation boundary layer;

DETAILED DESCRIPTION OF THE INVENTION

Figure 1:
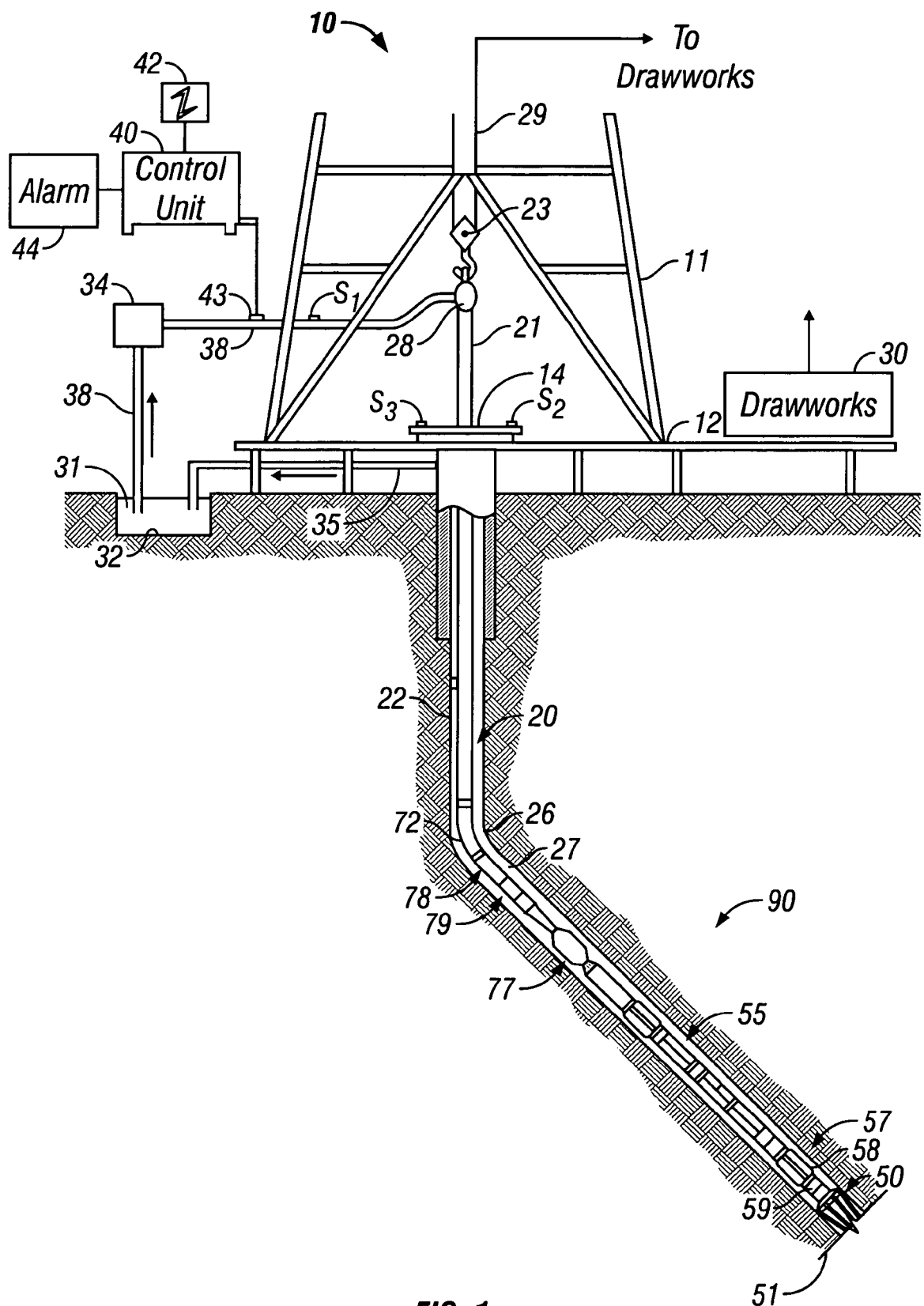
FIG. 1 (Prior Art) shows a measurement-while-driliing tool suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

FIG. 2 shows an apparatus of the present invention. A transmitter coil 201 and a receiver coil assembly are positioned along a damping portion 200 of drill pipe for suppressing an eddy current. The longitudinal axis of the drill tool defines a Z-direction of a coordinate system. An X-direction is defined so as to be perpendicular to the longitudinal axis of the drill tool. Damping portion 200 of the drill pipe is of length sufficient to reduce the magnetic field due to eddy currents on the surface of the pipe relative to the induced field produced by eddy currents in the formation. Transmitter coil 201 induces a magnetic moment within the surrounding formation. The receiver coil assembly comprises an array of Z-oriented 204 and X-oriented 205 coils having magnetic fields oriented so as to detect induced magnetic moments along orthogonal directions (i.e., $M_x$, $M_z$). A series of cuts made in the damping portion 200 of the drill pipe are typical for suppressing eddy currents. The drilling tool 200 of FIG. 2 lies horizontally within a formation 230 having resistivity $\rho_1$ and positioned with the longitudinal axis 210 substantially parallel to a boundary between formation 230 and formation 240 having resistivity $\rho_2$. The longitudinal axis 210 is at a distance L from boundary 235.

FIGS. 3a and 3b show examples of the azimuthal sensitivity of the Z-oriented receiver. FIG. 3a shows a first layer 301 and second layer 302 with the first layer having a resistivity $\rho_1$ and the second layer having a resistivity $\rho_2$. In the formation used in the example of FIGS. 3a and 3b, $\rho_1$=2 Ω–m and $\rho_2$=50 Ω–m. Transmitter 305 and receiver coils 306 are placed in a second layer so that the line connecting the axial centers of the transmitter and receiver lies parallel to boundary 310 at a distance L from the boundary between first and second layer. A typical distance to the boundary 310 between formations can range from 1 m to 11 m. A typical spacing between the transmitter and receiver can vary from 0.2 m to 12 m. The line connecting the axial centers of the transmitter and receiver loops lies substantially parallel to interface 310 at a distance L. For the illustrations of FIG. 3a and 3b, transmitter 305 and receiver 306 are oriented in the X-direction. In FIG. 3a, the induced moment of the X-directed receiver is toward the boundary, and in FIG. 3b, the induced moment of the X-directed receiver is away from the boundary.

At time t=0, the current flowing through the transmitter coil is shut off and changes from an initial value $I_0$ to 0. It should be noted that the method described works equally well if the transmitter is turned on and the current in the transmitter increases from a value of zero to a value of I. In this sense, what is involved is a step discontinuity in a current through the transmitter coil. The currents subsequently induced in the formation (i.e. eddy currents) diffuse outward in all the directions from the region close to the transmitter coil. These currents induce electromagnetic fields in the surrounding formation. The components of these fields can be measured by induction coils 204 and 205 placed along the conductive pipe 200. Measurements are taken while the rotating tool 200 moves along the trajectory 210 of the borehole. For a Z-oriented transmitter, where the drill tool lies in a homogeneous, full-space and horizontal well, the component measured by the Z-receiver 204 is the only non-zero component. When the drill tool lies in a horizontal, layered structure, (such as FIG. 2 and FIGS. 3a and 3b) both the Z and X components are non-zero and can be measured. As time increases after the transmitter is turned off, the induced eddy currents penetrate deeper into the formation and induce currents in the more distant conductive regions of the formation. Consequently, field components measured by Z-oriented and X-oriented receivers at early times are indicative of those signals induced in nearby conductive formations, and field components measured at later times are indicative of signals induced in more distant conductive formations.

With an X-oriented transmitter, the sensitivity of the X-component receivers 205 to the bed boundary 235 varies with time and with the spacing between the transmitter 201 and receiver 205. At early times, the X-receiver is mainly sensitive to the resistivity $\rho_1$ of the first formation 230 surrounding the tool. At intermediate times, the X-receiver grows increasingly sensitive to the bed boundary 235, with the sensitivity to the bed boundary growing from zero to a maximum level, then dropping to zero at later times. At late times, the signal depends on a combination of the resistivities $\rho_1$ and $\rho_2$. This is illustrated below with examples shown in FIGS. 4a, 5a, 6a, and 7a. Typically, at late times, the X-component decays according to $$\frac{1}{t^{5/2}} \quad (1)$$

The sensitivity of measurements to the bed boundary also depends on with the orientation of the receiver. With the same X-directed transmitter, the Z-receiver is sensitive to azimuth. Due to its azimuthal resolution capabilities, the Z-component (cross-component) is capable of distinguishing between layering of the models of FIG. 3a and of FIG. 3b, by way of a sign reversal. This feature of the Z-receiver enables a very high sensitivity of the Z-component to the bed boundary location compared to the X-component. Hence, cross-component measurements enable a high depth of investigation and an ability to resolve a formation in an azimuthal direction. Specifically, in transient field signals, the sensitivity of the Z-component with respect to a boundary is non-zero at very early times. This sensitivity reaches a maximum level at early times and then decreases with time. At late times, for $R_1/R_2 \gg 1$, the Z-component decays as $1/t^3$. This decay exhibits a higher sensitivity to the deep formation resistivity than the X-component. Examples are discussed below with reference to FIGS. 4B, 5B, 6B, and 7B.

Using an array of X and Z receivers such as 204 and 205 respectively in FIG. 2 enables acquiring a set of data that will contain sufficient information to find a distance to the boundary and a resistivity of the surrounding formation. A receiver array typically comprises approximately 3 to 5 X-receivers and 3 to 5 Z-receivers. An optimal spacing between the transmitter and X and Z receivers is typically from 0 to 10 meters. A plurality of measurements are used to increase robustness in defining formation parameters. A formation signal is typically measured during the 0.1–100 μsec time interval after the transmitter 201 is switched off.

The short spacing measurements in the 0.1–100 μsec time interval permit both the highest resolution to the bed boundary and the largest level of the measured signal. Therefore, an advantage of the present invention is the use of a short transmitter/receiver system as a basic configuration for MWD geosteering applications. The present invention can detect a bed boundary placed more than 10 m away from the tool. Ideally, a maximum sensitivity to the boundary can be obtained using receivers placed close (i.e. less than 2 m) to the transmitter, and with a signal measured during a 0–1 μsec time interval. Practical considerations include the speed at which the current can be switched off in order to enable accurate measurements in a time frame of less 0.1 μsec. Also, the differences in the orders of magnitude between the sensitivities of the X-component and of the Z-component at short transmitter-receiver spacing is to be considered. Thus an appropriate choice of spacing and time intervals best enables deep azimuthal measurements.

When an X-transmitter is used, typically the Z-component measurements are used for azimuthal resolution, while distance to the boundary and resistivity of the formation is obtained from the X-component measurements. Alternatively, a Z-orientation of the transmitter can be used to give a resolution of an oil/water boundary similar to that of an X-oriented transmitter. If a Z-transmitter is used instead of an X-transmitter, typically the X-component measurements are useful for azimuthal resolution, while distance to the boundary and resistivity of the formation is obtained from the Z-component measurements.

Figure 4A:
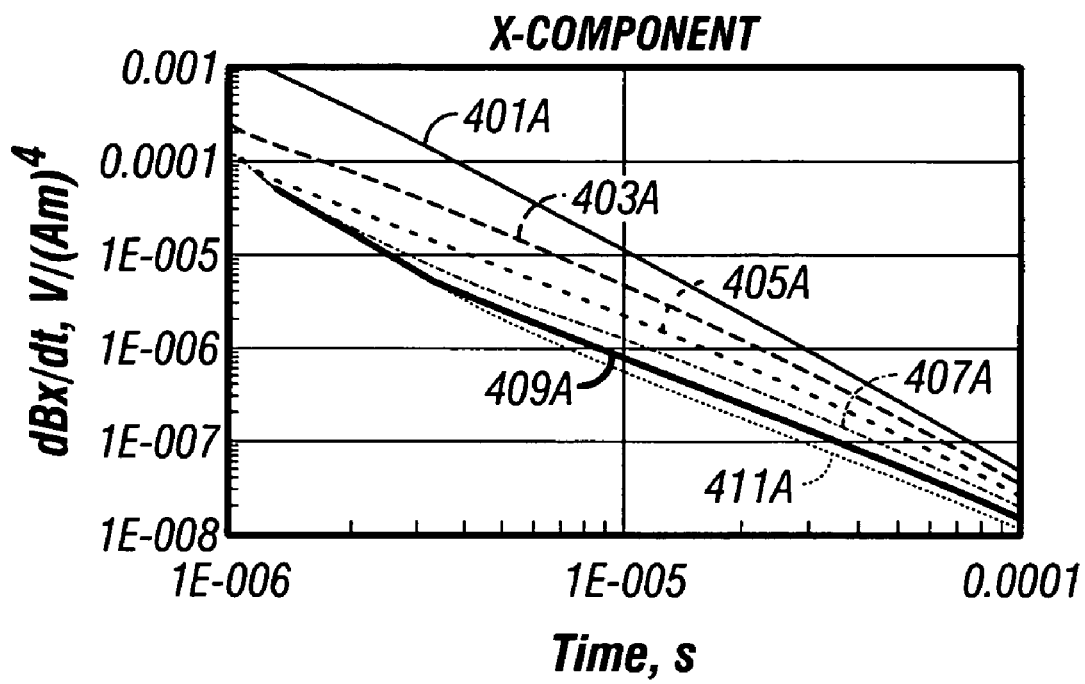
FIGS. 4A–B show modeling results representing transient responses for Z and X oriented receivers at a distance of 0.2 m from an X-oriented transmitter.
Figure 4B:
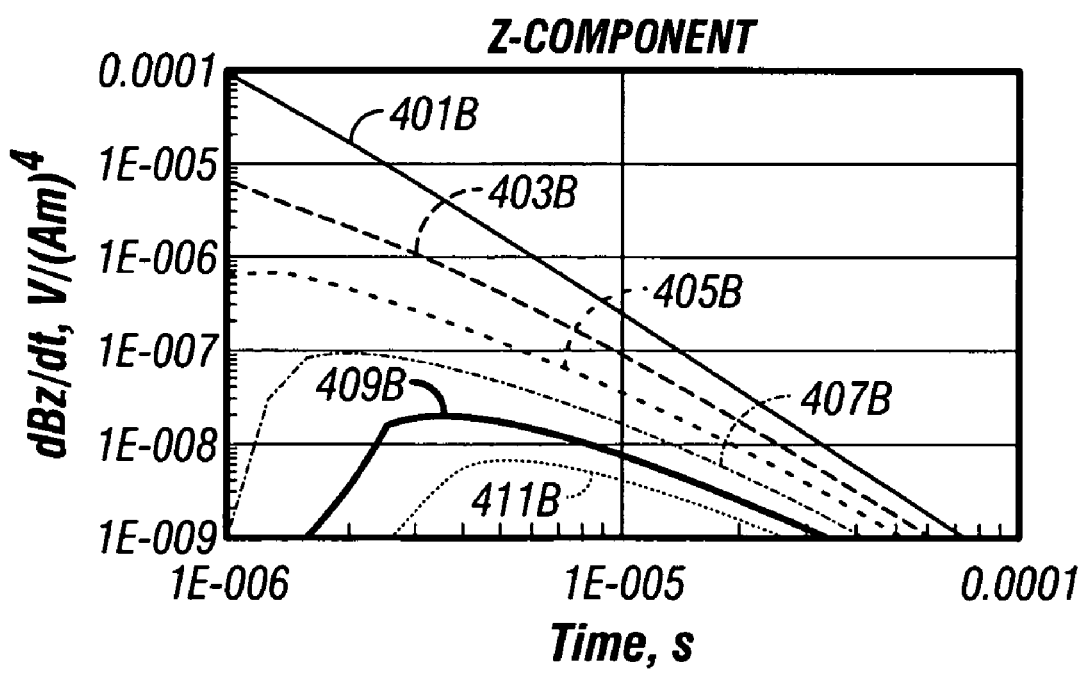

FIGS. 4a–b, 5a–b, 6a–b, and 7a–b illustrate the high-resolution capabilities of the transient MWD tool of the present invention. Mathematical modeling results are shown using a two-layered formation such as shown in FIG. 2. An X-directed transmitter and X- and Z-directed receivers are used. FIGS. 4a and 4b show both X- and Z-components, respectively, obtained at a transmitter-receiver spacing of 0.2 m. Curve 401a represents the response of the tool placed at a distance of 1 m from the formation boundary. Curves 403a, 405a, 407a, 409a, and 411a further represent responses at distances of 3 m, 5 m, 7 m, 9 m and 11 m, respectively. Time is plotted in units of seconds along the abscissa and $dB_x/dt$ is plotted along the ordinate in units of V/(Am$^4$). In FIG. 4b, curve 401b represents a response of a tool at a distance of 1 m from the formation boundary. Curves 403b, 405b, 407b, 409b, and 411b further represent responses at a distance of 3 m, 5 m, 7 m, 9 m and 11 m, respectively. Time is plotted in units of seconds along the abscissa and $dB_z/dt$ is plotted along the ordinate in units of $V/(Am^4)$.

At a transmitter-receiver spacing of 0.2 m, with an X-transmitter, the measurements of the Z-component in FIG. 4b have superior resolution compared to the X-component in FIG. 4a. This is seen by the larger separation of the curves in FIG. 4b compared to FIG. 4a. Maximum sensitivity to the bed boundary is typically found at the early times (time less than 5 μsec). In a model having depth-to-boundary less than 5 m, practical use of the Z-component is limited, despite increased resolution, since the signal value of the Z-component is several orders of magnitude less than the signal value of the X-component, thereby reducing a reliability of measurements in the X-direction. In the instance of formation models having a depth-to-boundary less than 5 m, the X-component measurement taken in the 0–2 m spacing range during the 0.1–100 μsec time interval is sufficient to enable of geo-steering. In this case, the sign of the Z-directed component can be used to define whether the boundary is above or below the tool.

FIGS. 5a–b, 6a–b, and 7a–b present modeling results for a transmitter-receiver spacing of 2 m, 6 m, and 12 m, correspondingly. Increasing the transmitter-receiver spacing increases the magnitude of the signal for the Z-component. In addition, increasing the spacing between the receiver and the transmitter improves the ratio between X- and Z-directed components of the signal. The choice of spacing is dictated by the operator's decision to resolve and determine parameters of deep formation (deeper than 5 m).

Figure 5A:
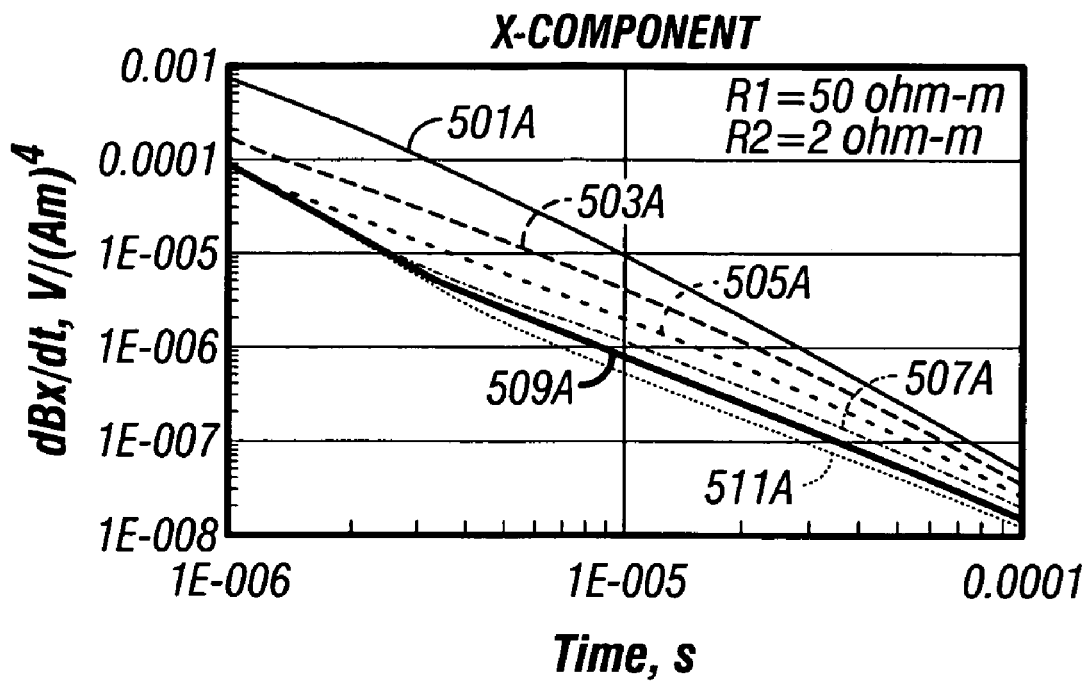
FIGS. 5A–B show modeling results representing transient responses for Z and X oriented receivers at a distance of 2 m from an X-oriented transmitter.
Figure 5B:
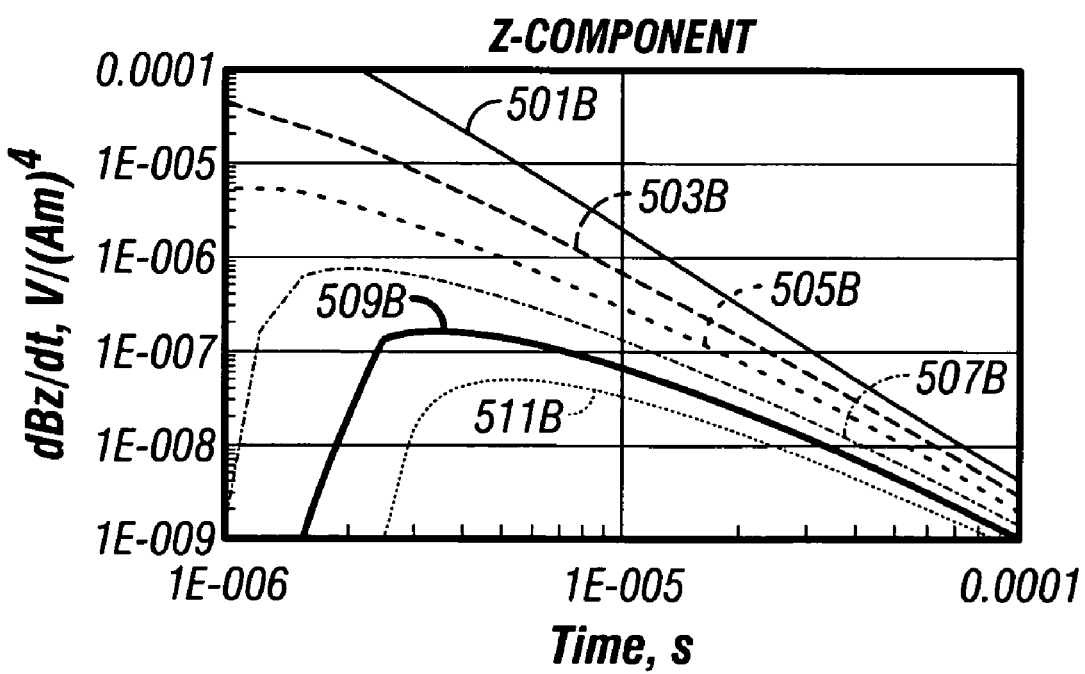

FIGS. 5a and 5b shows both X- and Z-components, respectively, obtained at a transmitter-receiver spacing of 2 m. In FIG. 5A, curve 501a represents a response of a tool at a distance of 1 m from the formation boundary. Curves 503a, 505a, 507a, 509a, and 511a further represent responses distances of 3 m, 5 m, 7 m, 9 m and 11 m, respectively. Time is plotted in units of seconds along the abscissa and $dB_x/dt$ is plotted along the ordinate in units of $V/(AM^4)$. In FIG. 5B, Curve 501b represents a response of a tool at a distance of 1 m from the formation boundary. Curves 503b, 505b, 507b, 509b, and 511b further represent responses at a distance of 3 m, 5 m, 7 m, 9 m and 11 m, respectively. Time is plotted in units of seconds along the abscissa and $dB_z/dt$ is plotted along the ordinate in units of $V/(Am^4)$.

Figure 6A:
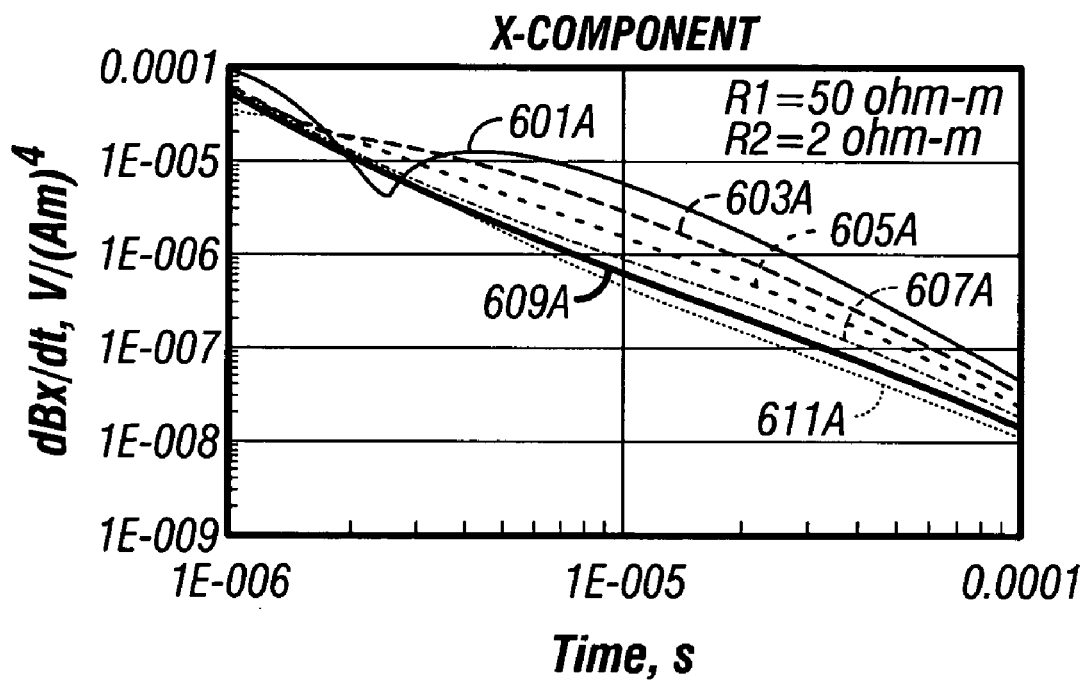
FIGS. 6A–B show modeling results representing transient responses for Z and X oriented receivers at a distance of 6 m from an X-oriented transmitter.
Figure 6B:
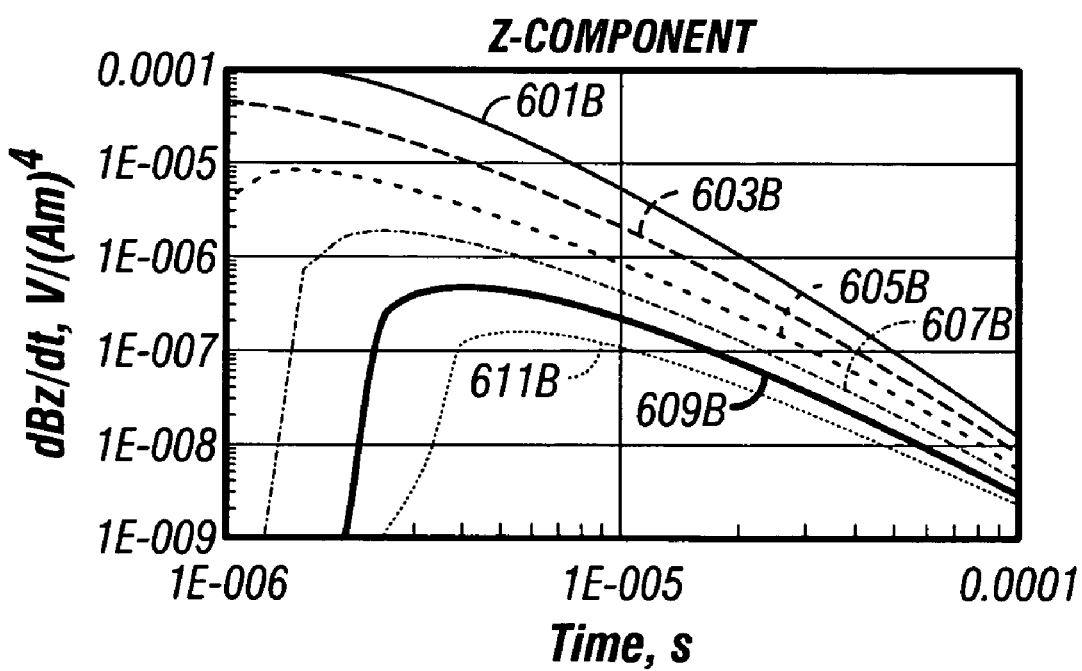

FIGS. 6a and 6b shows both X- and Z-components, respectively, obtained at a transmitter-receiver spacing of 6 m. In FIG. 6a, curve 601a represents a response of a tool at a distance of 1 m from the formation boundary. Curves 603a, 605a, 607a, 609a, and 611a further represent responses distances of 3 m, 5 m, 7 m, 9 m and 11 m, respectively. Time is plotted in units of seconds along the abscissa and $dB_x/dt$ is plotted along the ordinate in units of $V/(Am^4)$. In FIG. 6b, curve 601b represents a response of a tool at a distance of 1 m from the formation boundary. Curves 603b, 605b, 607b, 609b, and 611b further represent responses at a distance of 3 m, 5 m, 7 m, 9 m and 11 m, respectively. Time is plotted in units of seconds along the abscissa and $dB_z/dt$ is plotted along the ordinate in units of $V/(Am^4)$.

Figure 7A:
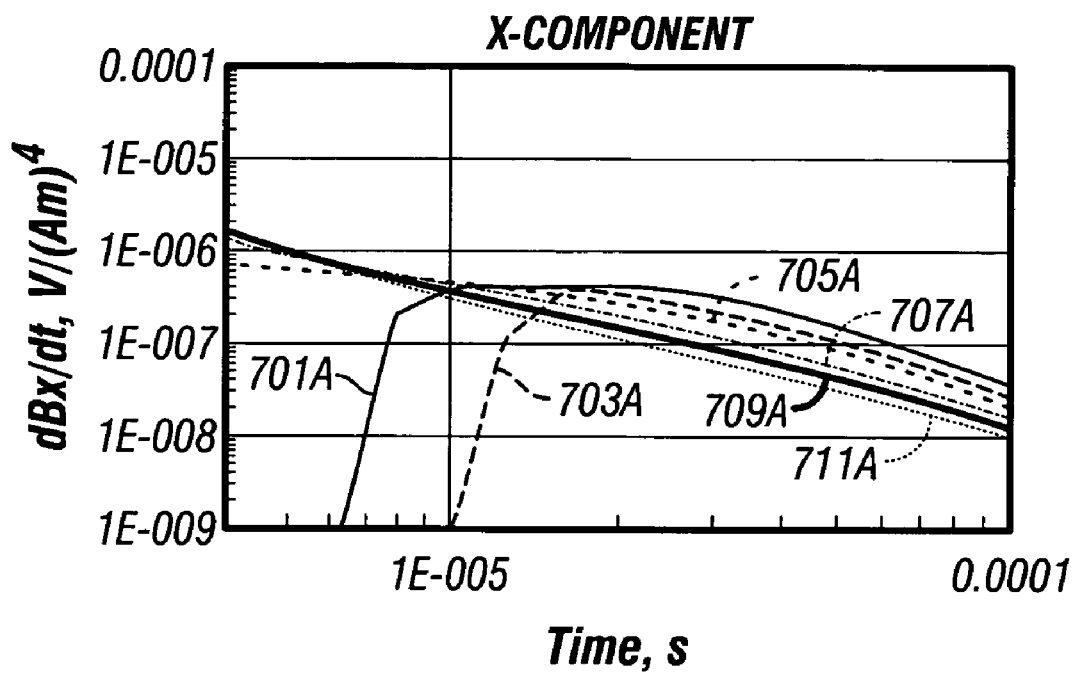
FIGS. 7A–B show modeling results representing transient responses for Z and X oriented receivers at a distance of 12 m from an X-oriented transmitter.
Figure 7B:
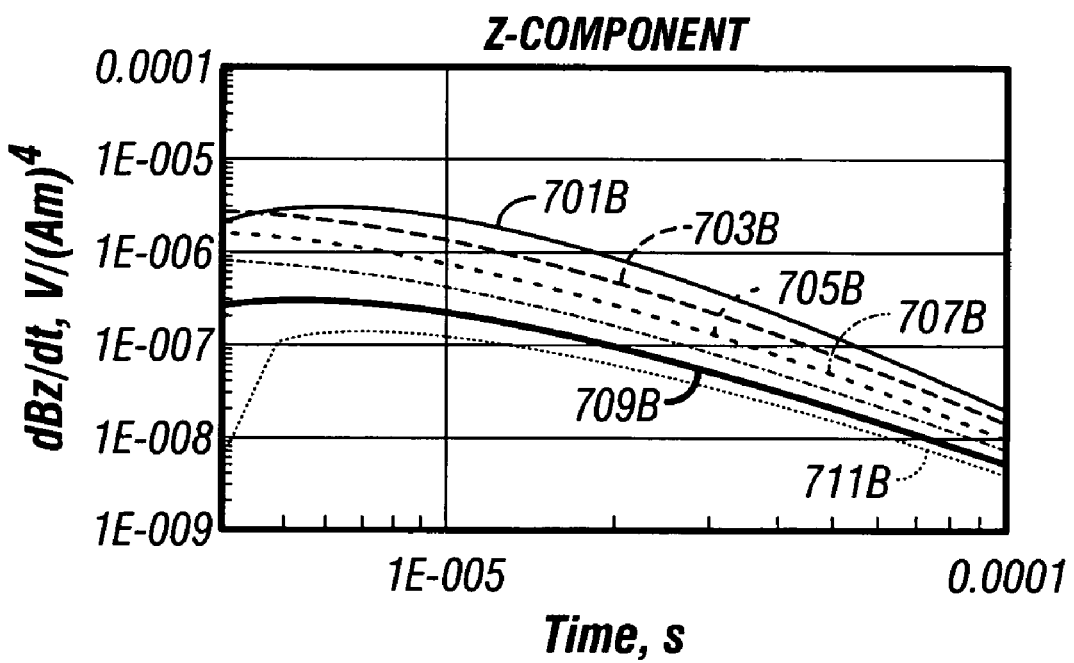

FIGS. 7a and 7b shows both X- and Z-components, respectively, obtained at a transmitter-receiver spacing of 12 m. In FIG. 7a, curve 701a represents a response of a tool at a distance of 1 m from the formation boundary. Curves 703a, 705a, 707a, 709a, and 711a further represent responses at a distance of 3 m, 5 m, 7 m, 9 m and 11 m, respectively. Time is plotted in units of seconds along the abscissa and $dB_x/dt$ is plotted along the ordinate in units of $V/(Am^4)$. In FIG. 7b, Curve 701b represents a response of a tool at a distance of 1 m from the formation boundary. Curves 703b, 705b, 707b, 709b, and 711b further represent responses at a distance of 3 m, 5 m, 7 m, 9 m and 11 m, respectively. Time is plotted in units of seconds along the abscissa and $dB_z/dt$ is plotted along the ordinate in units of $V/(Am^4)$.

Figure 8:
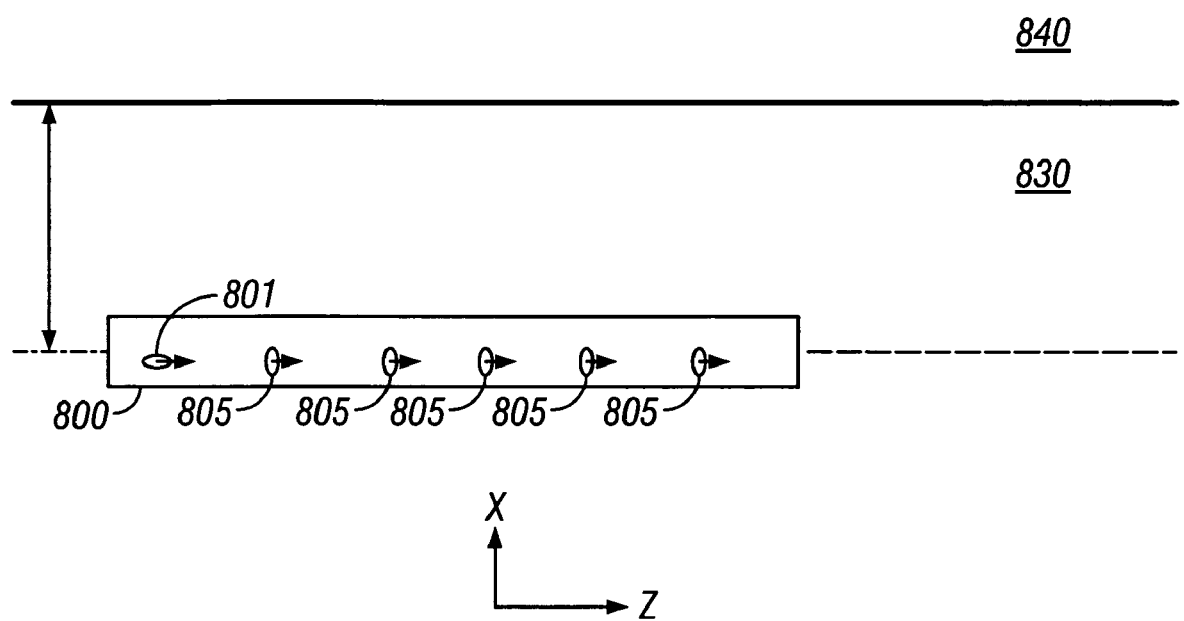
FIG. 8 shows a measurement tool in a horizontal well.

In another embodiment of the invention, subtracting a system response from a measured signal, can be used to increase a resolution of the transient system. An embodiment of the apparatus for use in subtracting a system response is shown in FIG. 8 and comprises Z-oriented transmitter coil 801 and Z-oriented receiver coils 805. The tool schematic and borehole drilling trajectory are also indicated in FIG. 8.

A transmitter coil 801 and a receiver coil assembly are positioned along a damping portion 800 of drill pipe for suppressing an eddy current. The longitudinal axis of the drill tool defines a Z-direction of a coordinate system. An X-direction is defined so as to be perpendicular to the longitudinal axis of the drill tool. Damping portion 800 of the drill pipe is of length sufficient to reduce a flow of eddy currents. Transmitter coil 801 induces a magnetic field substantially along the Z-direction. The receiver coil assembly comprises an array of Z-oriented coils 805. The drilling tool of FIG. 2 lies horizontally disposed within a formation 830 having resistivity $\rho_1$ and positioned with longitudinal axis 810 substantially parallel to a boundary 835 between formation 830 and formation 840 having resistivity $\rho_2$. The longitudinal axis 810 is at a distance L from boundary 835.

The tool of FIG. 8 comprises a pipe is surrounded on its outer diameter by a non-conducting material. The non-conductive material can be magnetic, for example. An encapsulated Z-directed transmitter is disposed along the outer circumference of the non-conductive material. The magnetic material may be a ferrite coating that reduces the contribution of the conductive pipe into the measured transient signal while boosting a signal contribution from the formation. Since ferrite coating increases an inductance of the system, this configuration enables a short length of the ferrite pipe.

Typical behavior of the transient signal can be studied using a cylindrical two-layered formation that simulates water/oil contact 835. The system is placed into the first layer 830 having resistivity $\rho_1$=50 Ω–m. Resistivity of the second layer is $\rho_2$=2 Ω–m. For FIGS. 9–14, the second layer 840 is located at different distances ranging from 4 m to 10 m from the tool. The spacing between the transmitter and receiver is varied between 0.5 m and 8 m.

Figure 9A:
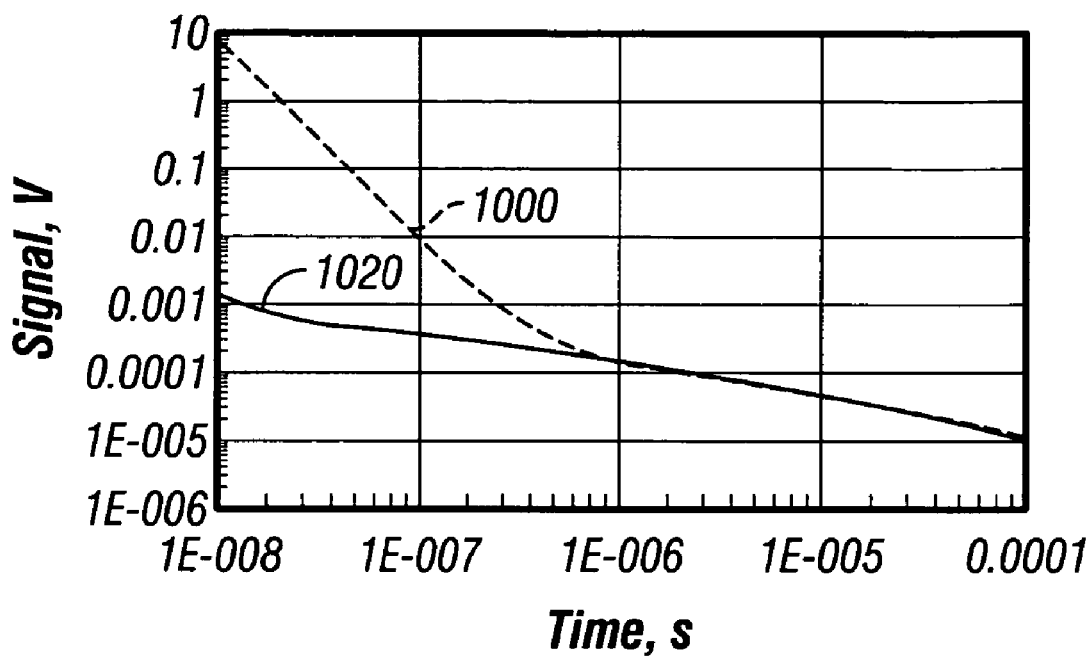
FIGS. 9A, 9B, 10A, 10B, 11A and 11B show original and improved signals from subtracting a calibration signal.
Figure 9B:
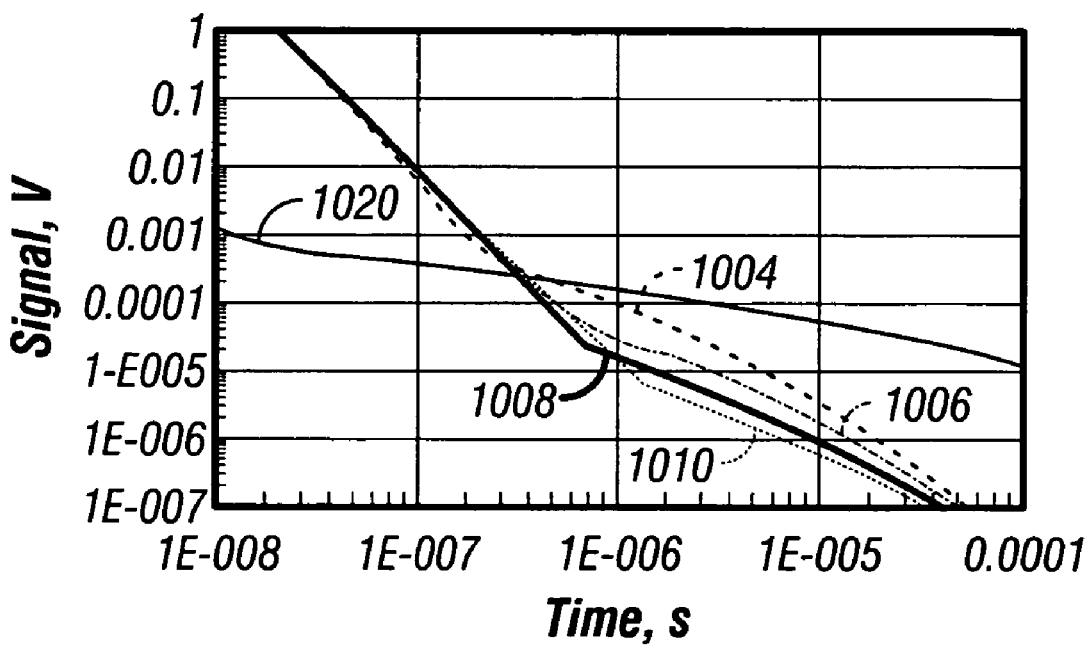
Figure 10A:
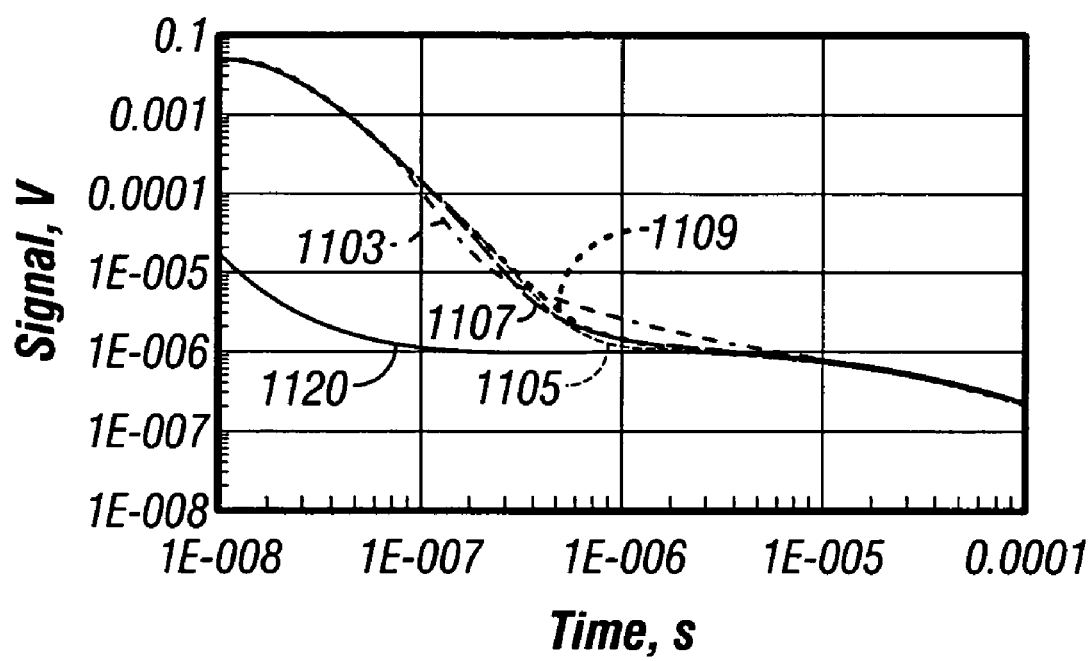
Figure 10B:
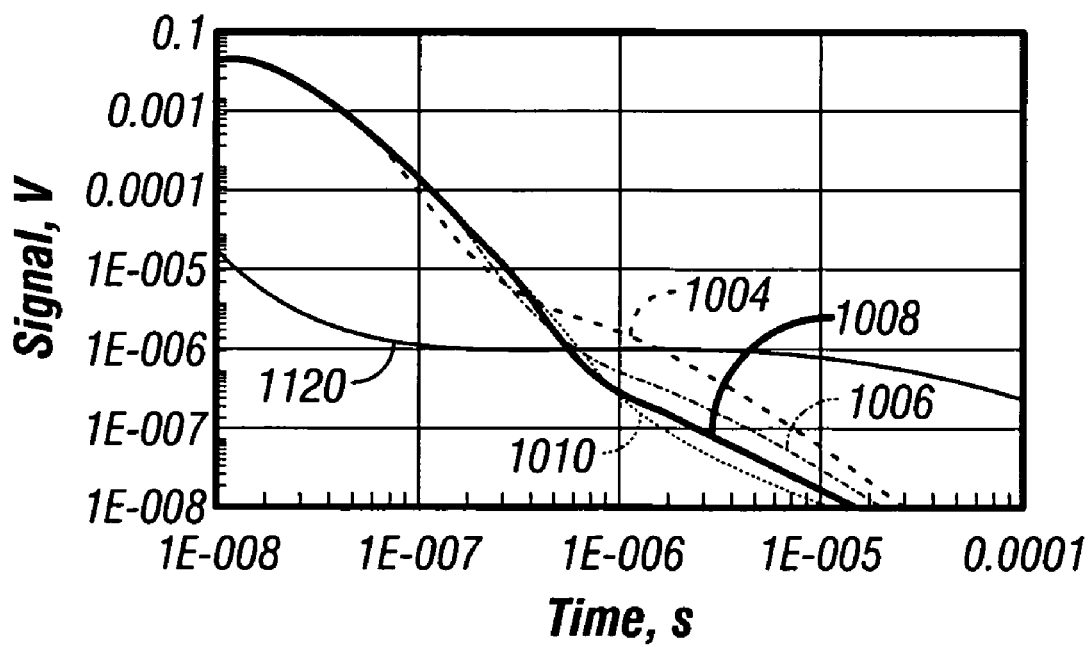
Figure 11A:
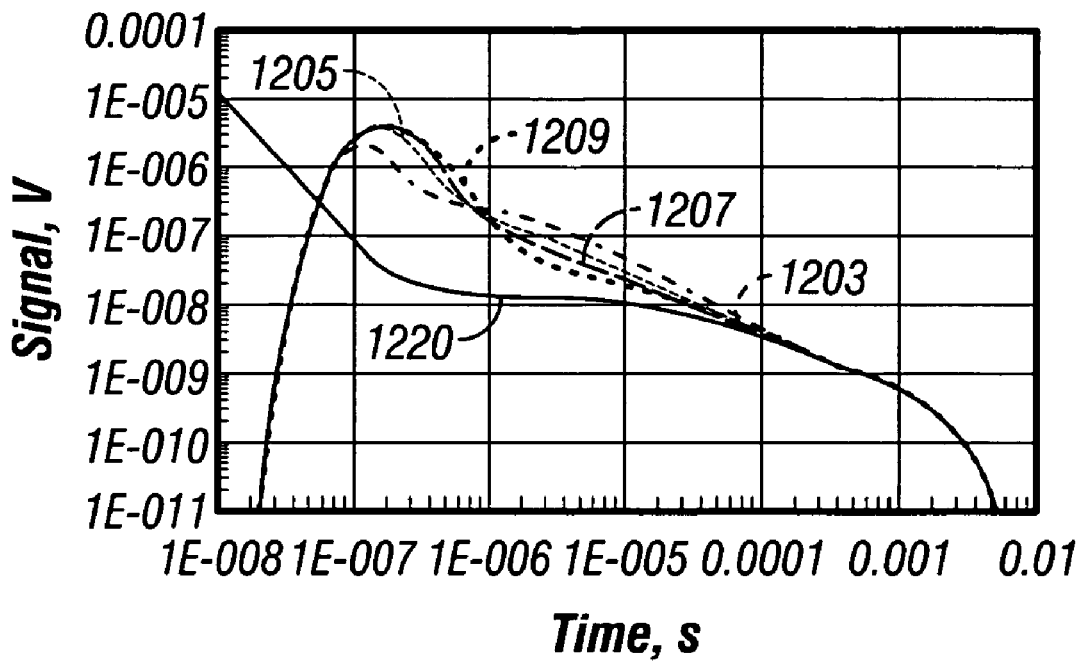
Figure 11B:
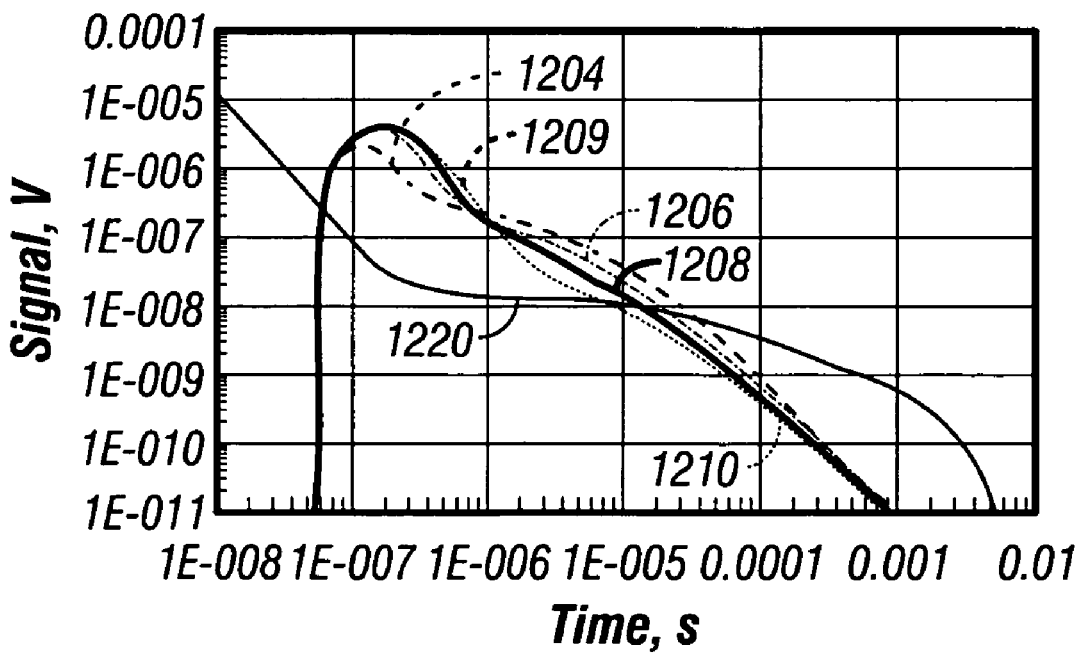

FIGS. 9a–9b, 10a–b, 11a–b, show two types of signals obtained via mathematical modeling at different transmitter-receiver spacings. The signals of FIGS. 9a, 10a, and 11a, are measured by the receiver coil 805 after the current in the transmitter 801 is switched off. The signals of FIGS. 9b, and 10b, and 11b are derived from the signals of FIGS. 10a, 11a, and 12a by subtracting the system response (calibration signal) measured in the absence of formation. The signals of FIGS. 9b, 10b, and 11b, (differential signals) have a superior resolution with respect to determining a position of the water/oil boundary.

In FIGS. 9–11 the length of the ferrite section is 1 m and the 0.5 m transmitter/receiver pair is centered with respect to it. The resistivity of the pipe is $0.714 \times 10^{-6}$ Ω–m. The resistivity of the first layer is 50 Ω–m, and the resistivity of the second pipe is 2 Ω–m, and μ=400. In FIGS. 12–14 the length of the ferrite section is increased to 1.5 m.

In FIG. 9a, signals are obtained at a depth-to-boundary of 4 m, 6 m, 8 m, and 10 m using a transmitter-receiver spacing of 0.5 m. As shown in FIG. 9a, the signals at these distances are early indistinguishable from one another. These curves are collectively labeled as 1000. An obtained signal due to a pipe outside a formation is shown in curve 1020. Differential signals obtained by subtracting pipe signal 1020 are shown in FIG. 9b. Curves for a depth-to-boundary spacing of 4 m, 6 m, 8 m, and 10 m are shown as 1004, 1006, 1008, and 1010 correspondingly.

Similarly, in FIG. 10a, signals are obtained at a depth-to-boundary of 4 m, 6 m, 8 m, and 10 m using a transmitter-receiver spacing of 2.0 m. The signals of FIG. 10a can be slightly distinguished from one another. Curves obtained at depth-to-boundary spacing of 4 m, 6 m, 8 m, and 10 m are labeled 1103, 1105, 1107, and 1109, correspondingly. Differential signals obtained by subtracting pipe signal 1120 are shown in FIG. 10b. Curves for a depth-to-boundary spacing of 4 m, 6 m, 8 m, and 10 m are shown as 1104, 1106, 1108, and 1110 correspondingly.

In FIG. 11a, signals are obtained at a depth-to-boundary of 4 m, 6 m, 8 m, and 10 m using a transmitter-receiver spacing of 8.0 m. Curves obtained at depth-to-boundary spacing of 4 m, 6 m, 8 m, and 10 m are labeled 1203, 1205, 1207, and 1209, correspondingly. Differential signals obtained by subtracting pipe signal 1220 are shown in FIG. 11b. Curves for a depth-to-boundary spacing of 4 m, 6 m, 8 m, and 10 m are shown as 1204 1206, 1208, and 1210 correspondingly.

In FIG. 11a where the receiver placed 8 m away from the transmitter, there is a capability of resolving 8 m and 10 m water/oil boundary distances. But even at this transmitter receiver spacing, the signal level measured by this receiver is in the range of 0.1–0.01 µV. For MWD application, higher resolution and smaller transmitter/receiver spacing is desirable.

To increase a resolution of the transient system, differential measurements are made where the system response is subtracting for the original measured signals. For instance, subtracting the pipe response 1020 from those curves simultaneously labeled as 1000 in FIG. 9a yields curves 1004, 1006, 1008, and 1010 of FIG. 9b. The differential transient signal has improved resolution with respect to the oil/water boundary and the signal level at a transmitter-receiver spacing of 0.5 m is In the range of micro volts, even for the far-located 10 m oil/water boundary. As in any other differential measurements, the challenge in the transient differential measurements is to provide sufficient accuracy in the signals involved into the operation of subtraction. As shown in FIG. 9a, and FIG. 10b, the differential curves are 10–100 times less than the calibration curve (in case of 10m distance to the boundary). In case of 100 times ratio between calibration (or original) curve and differential curve, the last is hard to synthesize with sufficient accuracy.

Increasing the length of the ferrite, for example, to 1.5 m, improves the ratio of the differential curve to the calibration curve. The corresponding modeling results for a ferrite pipe of length 1.5 m are presented in FIGS. 12a, 13a, and 14a, along with the differential curves presented in FIGS. 12b, 13b and 14b. FIG. 12b shows that the differential signal is well-resolved with respect to oil/water distance, has high level (~10 µV) and only 15 times less than calibration signal (10 m distance to the boundary, 10 µsec time moment). This signal can be both reliably derived and accurately interpreted.

Figure 12A:
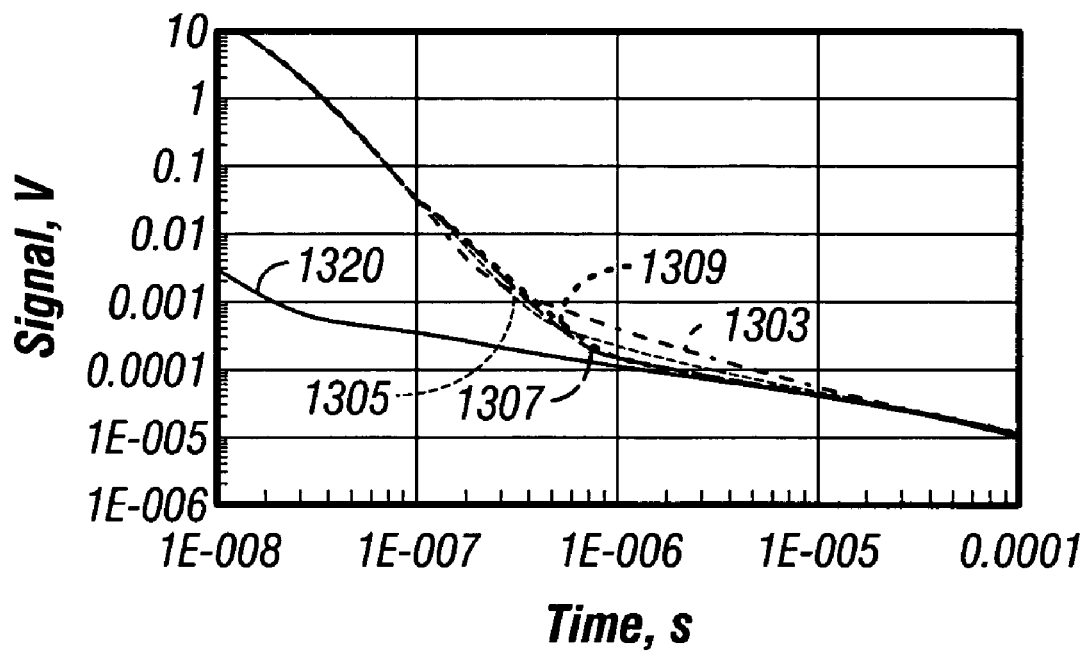
FIGS. 12A, 12B, 13A, 13B, 14A AND 14B show original and improved signals from subtracting a calibration signal from an increased length of a ferrite section.
Figure 12B:
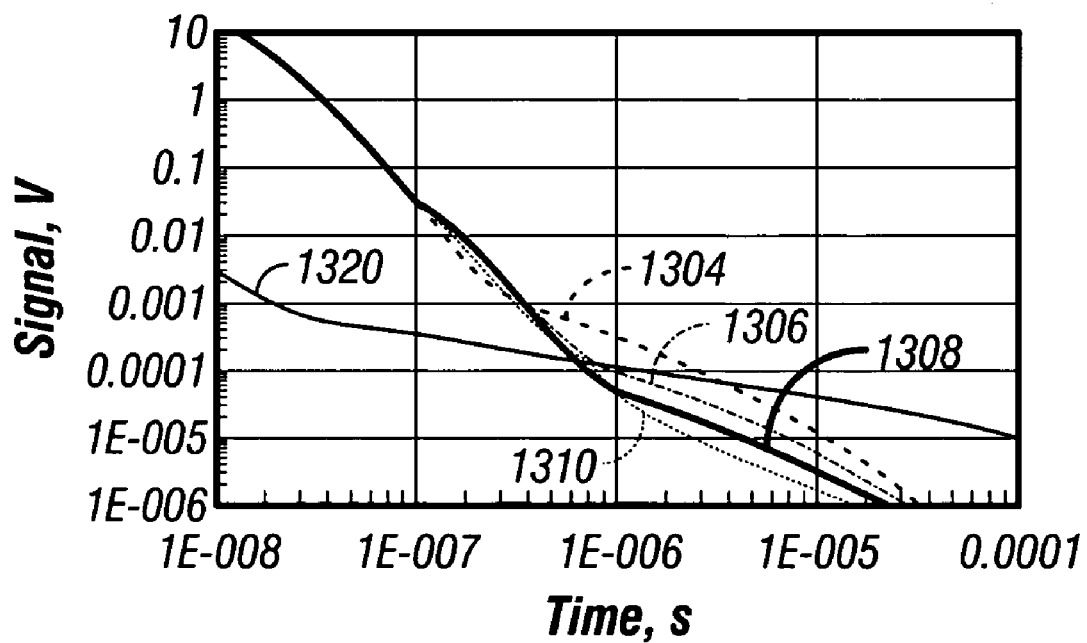

In FIG. 12a, signals are obtained at a depth-to-boundary of 4 m, 6 m, 8 m, and 10 m using a transmitter-receiver spacing of 0.5 m. Curves obtained at depth-to-boundary spacing of 4 m, 6 m, 8 m, and 10 m are labeled 1303, 1305, 1307, and 1309, correspondingly. Differential signals obtained by subtracting pipe signal 1320 are shown in FIG. 12b. Curves for a depth-to-boundary spacing of 4 m, 6 m, 8 m, and 10 m are shown as 1304, 1306, 1308, and 1310 correspondingly.

Figure 13A:
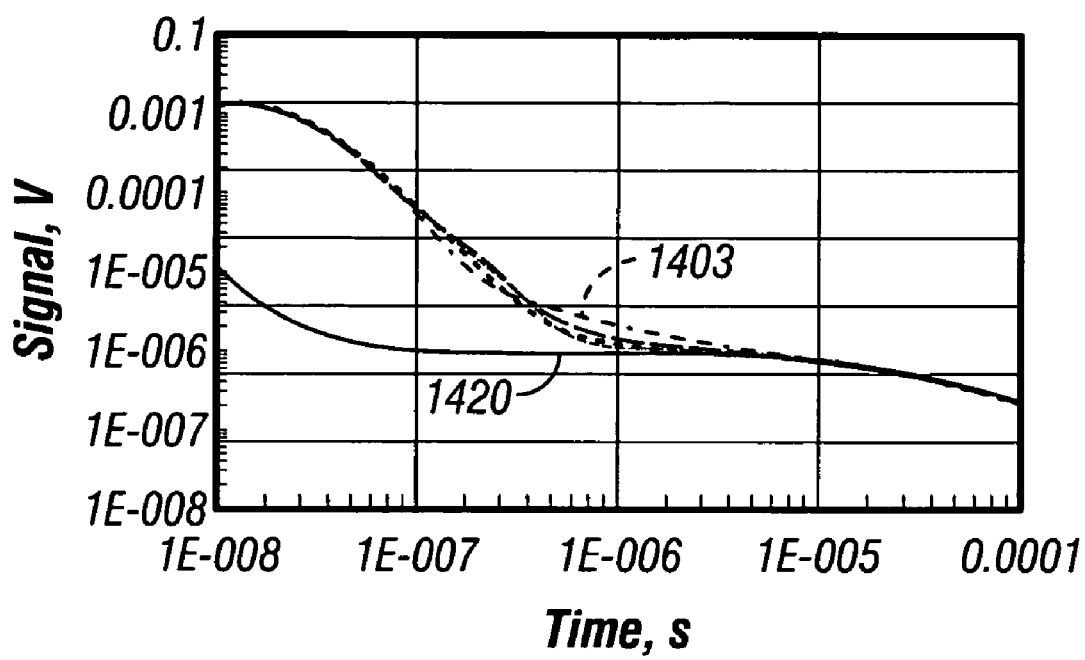
Figure 13B:
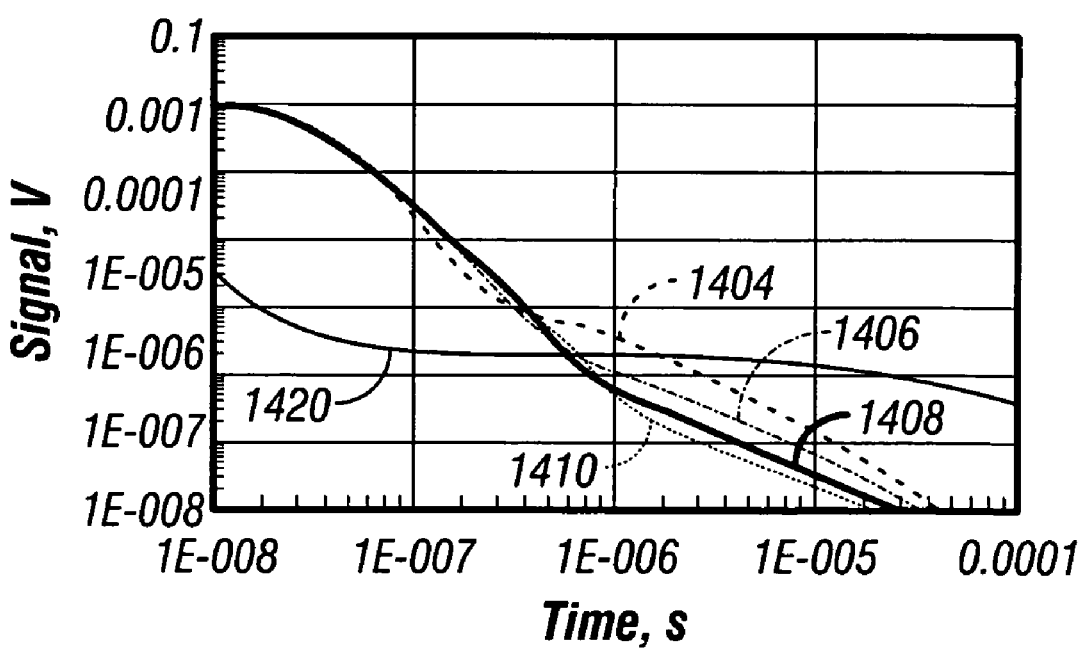

In FIG. 13a, signals are obtained at a depth-to-boundary of 4 m, 6 m, 8 m, and 10 m using a transmitter-receiver spacing of 2.0 m. Curves obtained at depth-to-boundary spacing of 4 m, 6 m, 8 m, and 10 m are labeled 1403, 1405, 1407, and 1409, correspondingly. Differential signals obtained by subtracting pipe signal 1820 are shown in FIG. 13b. Curves for a depth-to-boundary spacing of 4 m, 6 m, 8 m, and 10 m are shown as 1404, 1406, 1408, and 1410 correspondingly.

Figure 14A:
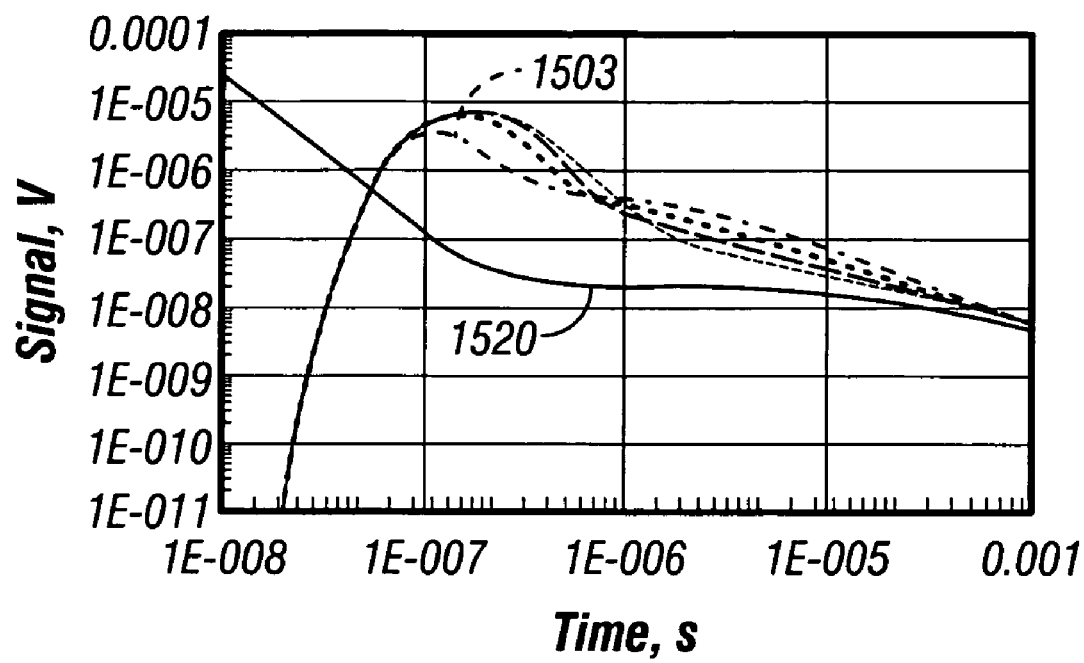
Figure 14B:
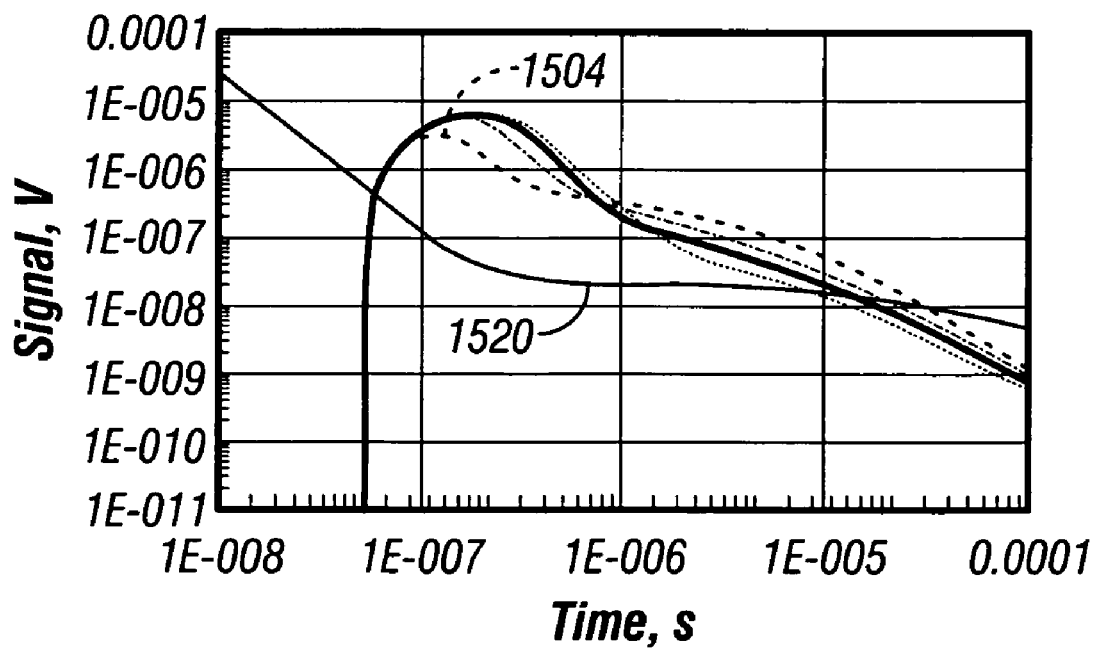

In FIG. 14a, signals are obtained at a depth-to-boundary of 4 m, 6 m, 8 m, and 10 m using a transmitter-receiver spacing of 8.0 m. Curves obtained at depth-to-boundary spacing of 4 m, 6 m, 8 m, and 10 m are labeled 1503, 1505, 1507, and 1509 correspondingly. Differential signals obtained by subtracting pipe signal 1520 are shown in FIG. 14b. Curves for a depth-to-boundary spacing of 4 m, 6 m, 8 m, and 10 m are shown as 1504, 1506, 1508, and 1510 correspondingly.

It should be pointed out that the present invention has been described above with reference to X- and Z-component transmitters and receivers. This is not intended to be a limitation since it is well known in the art to perform a rotation of coordinates whereby orthogonal measurements can be obtained from measurements made with receivers having coils that are simply inclined to each other.

A particular application of either of the embodiments of the invention described above is in reservoir navigation. An example of the use of resistivity is given in U.S. Pat. No. RE35,386 to Wu et al, having the same assignee as the present application and the contents of which are fully incorporated herein by reference. Disclosed in Wu is a method for detecting and sensing boundaries between strata in a formation during directional drilling so that the drilling operation can be adjusted to maintain the drillstring within a selected stratum is presented. The method comprises the initial drilling of an offset well from which resistivity of the formation with depth is determined. This resistivity information is then modeled to provide a modeled log indicative of the response of a resistivity tool within a selected stratum in a substantially horizontal direction. A directional (e.g., horizontal) well is thereafter drilled wherein resistivity is logged in real time and compared to that of the modeled horizontal resistivity to determine the location of the drill string and thereby the borehole in the substantially horizontal stratum. From this, the direction of drilling can be corrected or adjusted so that the borehole is maintained within the desired stratum. The resistivity measurements made in Wu are made with a conventional electromagnetic (EM) propagation resistivity instrument. The measurements made with a propagation EM tool lack directional information. Another example of reservoir navigation using multi-component measurements is described in copending U.S. patent application Ser. No. 10/373,365 of Merchant et al., having the same assignee as the present invention and the contents of which are fully incorporated herein by reference. The principles described in Wu or Merchant can be used with transient measurements (as described above) for maintaining the drillstring at a desired distance from an interface, such as a gas-oil contact or an oil-water contact.

The method and apparatus of the present invention has been described above with reference to a MWD embodiment. This is not to be construed as a limitation as the invention can also be practiced with the apparatus conveyed on a wireline.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method of using an electromagnetic instrument in a borehole in an earth formation, the method comprising:
    (a) changing a current through a transmitter on said instrument and inducing a current in said earth formation;
    (b) receiving a temporal signal resulting from said induced current in at at least one receiver on said instrument, said received temporal signal including effects of a conductive body of said instrument;
    (c) using a reference signal and said temporal signal for estimating a distance to an interface in said earth formation, said estimating being substantially unaffected by said conductive body.

2. The method of claim 1 further comprising determining a direction to said interface.

3. The method of claim 1 wherein said estimating the distance further comprises subtracting said reference signal from said temporal signal.

4. The method of claim 1 wherein said changing of said current through said transmitter comprises turning off said current through said transmitter.

5. The method of claim 1 wherein said changing of said current through said transmitter comprises turning on a current through said transmitter.

6. The method of claim 1 wherein said transmitter has an axial direction substantially parallel to an axis of said instrument.

7. The method of claim 1 further comprising obtaining said reference signal by measuring a temporal signal in a substantially homogenous medium.

8. The method of claim 1 wherein said electromagnetic instrument is conveyed on a bottomhole assembly (BHA) into said borehole, the method further comprising using said determined distance for controlling a drilling direction of said BHA.

9. The method of claim 1 wherein said interface comprises a bed boundary.

10. The method of claim 1 wherein said interface comprises a fluid interface selected from:
    (i) a gas-oil interface,
    (ii) an oil-water interface, and
    (iii) a gas-water interface.

11. An apparatus for determining a parameter of an earth formation, the apparatus comprising:
    (a) an instrument having a conductive body and including a transmitter which induces a current in said earth formation;
    (b) at least one receiver on said instrument which receives a temporal signal resulting from said induced current, said temporal signal being affected by said conductive body;
    (c) a processor which estimates from a reference signal and said temporal signal a distance to an interface in said earth formation, said determination being substantially unaffected by said conductive body.

12. The apparatus of claim 11 wherein said processor further determines a direction to said interface.

13. The apparatus of claim 11 wherein said processor estimates the distance by subtracting said reference signal from said temporal signal.

14. The apparatus of claim 11 wherein said transmitter has an axial direction substantially parallel to an axis of said instrument.

15. The apparatus of claim 11 wherein said reference signal is obtained by measuring a temporal signal in a substantially homogenous medium.

16. The apparatus of claim 11 further comprising a bottomhole assembly (BHA) which conveys said electromagnetic instrument into said borehole, and wherein the processor further uses said determined distance for controlling a drilling direction of said BHA.

17. The apparatus of claim 11 wherein said interface comprises a bed boundary.

18. The apparatus of claim 11 wherein said interface comprises a fluid interface selected from:
    (i) a gas-oil interface,
    (ii) an oil-water interface; and
    (iii) a gas-water interface.

19. The apparatus of claim 11 wherein said instrument comprises a conductive tubular member, and said transmitter is separated from said tubular member by a non-conductive material.

20. The apparatus of claim 19 wherein said non-conductive material comprises a ferrite.

* * * * *